United States Patent [19]

Tada

[11] Patent Number: 5,050,046
[45] Date of Patent: Sep. 17, 1991

[54] SURFACE LIGHTING APPARATUS
[75] Inventor: Masahiko Tada, Sanda, Japan
[73] Assignee: Mitsubishi Denki Kabushiki Kaisha, Tokyo, Japan
[21] Appl. No.: 385,175
[22] Filed: Jul. 26, 1989
[30] Foreign Application Priority Data Jul. 27, 1988 [JP] Japan .................. 63-188825

[51] Int. Cl.⁵ .................................. F21V 8/00
[52] U.S. Cl. ........................... 362/26; 362/31
[58] Field of Search ..................... 362/23, 26, 31

[56] References Cited

U.S. PATENT DOCUMENTS

| 2,347,665 | 5/1944 | Christensen et al. | 362/97 |
| 3,491,245 | 1/1970 | Hardesty | 362/26 |
| 4,630,895 | 12/1986 | Abdala, Jr. et al. | 362/31 |
| 4,714,983 | 12/1987 | Lang | 362/31 |
| 4,779,166 | 10/1988 | Tanaka et al. | 362/31 |
| 4,933,814 | 6/1990 | Sanai | 362/31 |

FOREIGN PATENT DOCUMENTS 62-69281 4/1987 Japan .

Primary Examiner—Ira S. Lazarus
Assistant Examiner—Sue Hagarman
Attorney, Agent, or Firm—Burns, Doane, Swecker & Mathis

[57] ABSTRACT

In a surface lighting apparatus (13), a light guide (11) of transparent plastic plate has two trapezium shaped top parts, each having cylindrical holes (11a), (11g) wherein incandescent lamps (9) (10) are mounted, and a reflecting frame (12) having reflective inner walls is disposed closely around the light guide (11), and the light emitted from the incandescent lamps (9) (10) illuminate the LCD (4) uniformly, as backlighting apparatus.

3 Claims, 3 Drawing Sheets

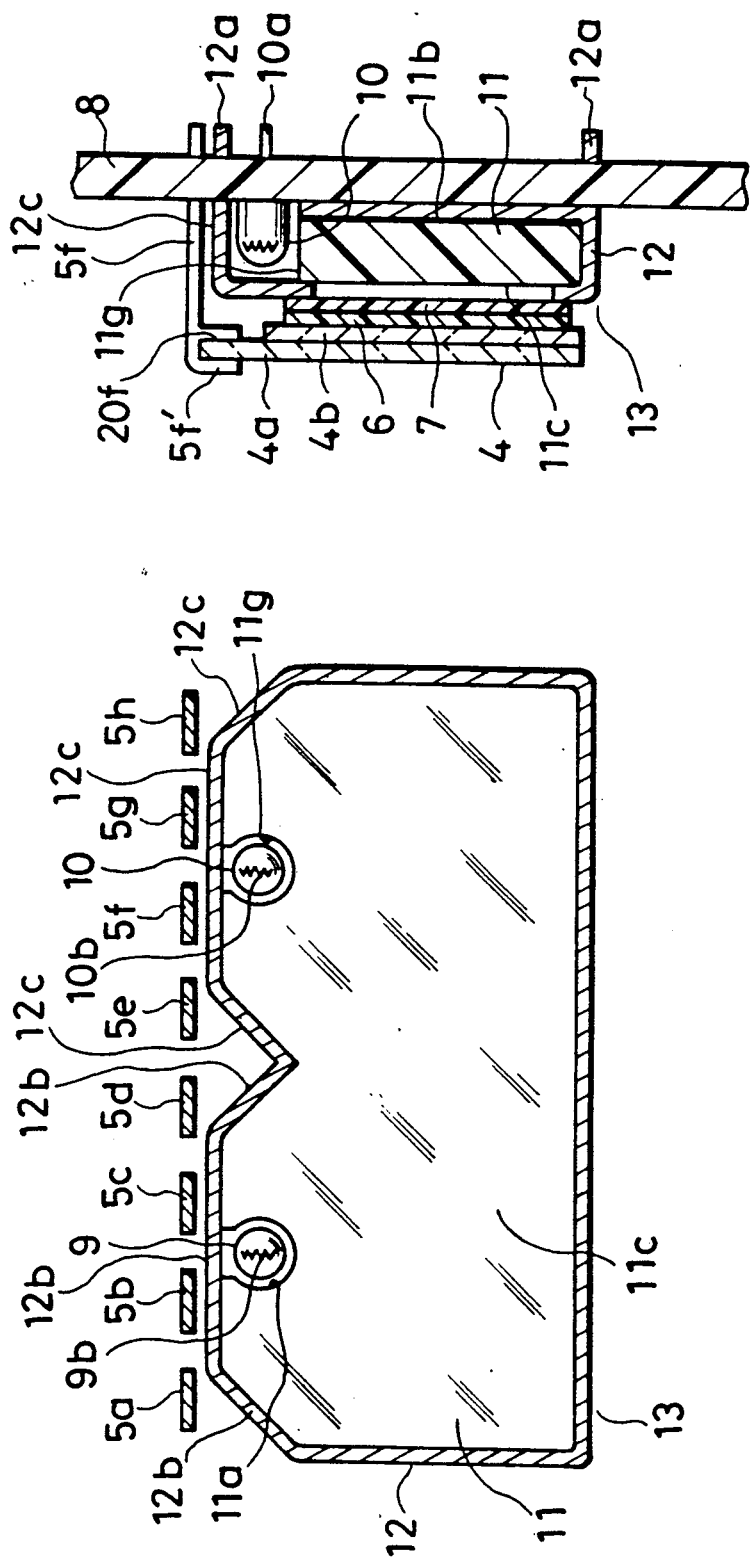

SURFACE LIGHTING APPARATUS

FIELD OF THE INVENTION AND RELATED ART STATEMENT

1. FIELD OF THE INVENTION

The present invention relates to a surface lighting apparatus to be used for backlighting of a transparent panel such as a liquid crystal display board.

2. DESCRIPTION OF THE RELATED ART

A conventional surface lighting apparatus has light sources which are mounted near end face of a light guide made of acrylic resin. The light emitted from the light sources enter the end face of the light guide. And, the light which have passed the light guide is reflected to diffuse by a reflective layer of paint on a rear of the light guide. As a result a front surface of the light guide emits light. And, the surface lighting apparatus is mounted on a rear face of a liquid crystal display panel (hereinafter is referred as LCD) as a backlighting thereof.

The light sources of the conventional surface lighting apparatus are mounted near the straight end face of the light guide. Thus, on the end face, the farther the position from the light source is, the more faint the luminous energy becomes. Further, when an incidence angle of the light to the end face of the light guide is larger than the critical angle of the light guide, the light is reflected at the end face owing to known total reflection phenomena. The critical angle of acrylic resin is about 45°. Accordingly, the distant part from the light source becomes darker than the part of smaller distance therefrom. Also, when an incandescent lamp with a straight filament is used as a light source, the straight filament must be arranged parallel to the end face line in order to make the light conduction to the light guide effective. Thus, in the vicinity of the light guide positioned near the lamp, quantity of incident ligth becomes large, while in the distant part from the lamp the quantity of incident light is small. Therefore, the conventional surface lighting apparatus could not afford uniform lighting to the object.

OBJECT AND SUMMARY OF THE INVENTION

It is an object of the present invention to provide a surface lighting apparatus which can emit light uniformly from the surface of the light guide.

The surface lighting apparatus comprises
at least one light source for emitting the light,
a light guide of light conductive material having at least one light receiving end face which is arranged to surround the light source,
a light-diffusing reflective layer provided on a rear face of the light guide, and
a reflective frame having a light reflective inside walls and light output opening in a front face thereof, and surrounding the light guide closely, to reflect light uniformly in the light guide.

According to the present invention, since the light sources are mounted on the upper end of the surface lighting apparatus at the rear face of the LCD, the hitherto-not-used space between the terminals of the LCD and edge of the light guide can be utilized effectively, and the surface lighting apparatus can be made compact.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2 is a sectional view of a surface lighting apparatus of FIG. 1.

FIG. 3 is a vertical sectional view of FIG. 1

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
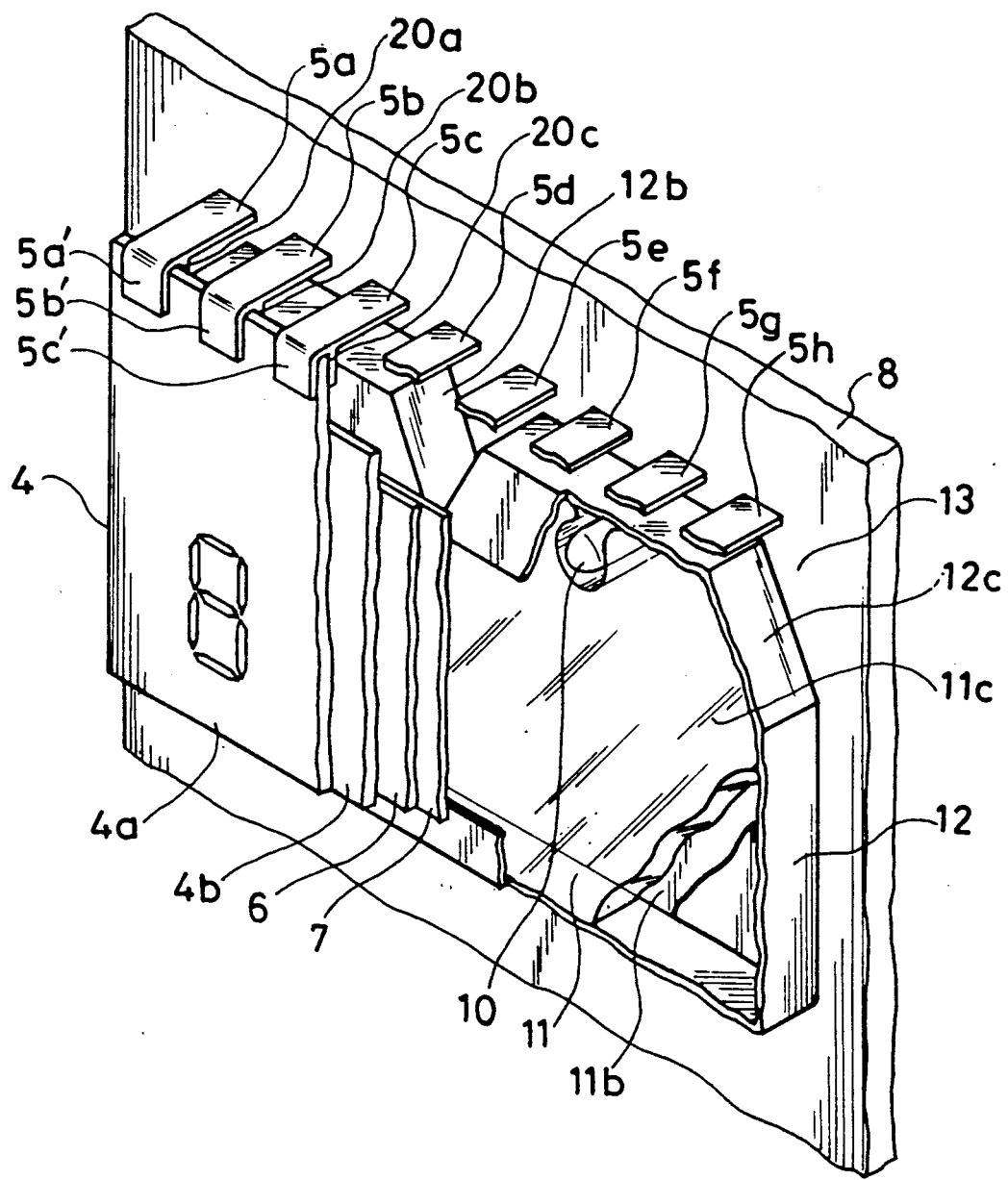
FIG. 1 is a perspective view of a surface lighting apparatus of a preferred embodiment of the present invention.
Figure 4:
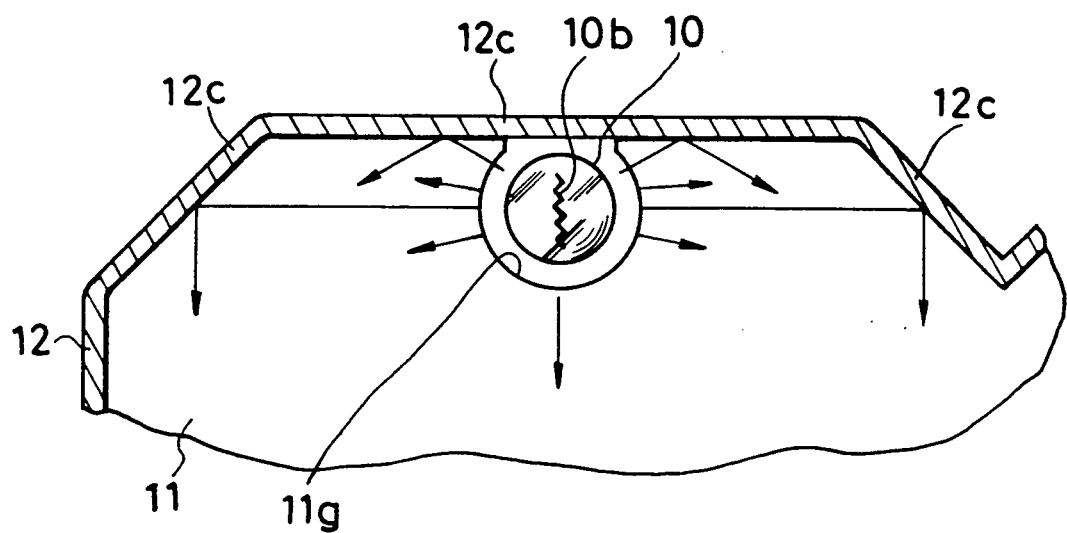
FIG. 4 is an enlarged view of a potions of the surface lighting apparatus of FIG. 1.

Hereafter, a preferred embodiment of the present invention is described with reference to the accompanying drawings. FIG. 1 is a perspective view of a surface lighting apparatus 13 of the invention. FIG. 2 and FIG. 3 are sectional views of the surface lighting apparatus of FIG. 1. FIG. 4 is an enlarged view of a portion of this preferred embodiment. In these figures, a liquid crystal display panel (LCD) 4 comprises a first glass plate 4a, a second glass plate 4b, and liquid crystal and transparent electrodes disposed therebetween. The liquid crystal and the transparent electrodes are sandwiched between the first and the second glass plates 4a, 4b in the manner of known art. The LCD 4 indicates a predetermined display patterns such as letters, numerals or marks by operation of a known control circuit (not shown) connected to leads 5a, 5b, 5c, 5d, 5e, 5f, 5g, 5h. Terminals 20a, 20b, 20c, 20d, 20e, 20f, 20g, 20h of the transparent electrode are mounted on top part position of the rear face of the first glass plate 4a, and connected electrically to the leads 5a, 5b, 5c ..., respectively. And, holders 5a', 5b', 5c', 5d', 5e', 5f', 5g', 5h' of the leads 5a, 5b, 5c ... hold the terminals 20a, 20b, 20c, ... provided on the first glass plate 4a, respectively. A transparent dimmer 6 for producing uniform quantity of light by adjusting local diffusions of light is disposed on the rear face of the second glass plate 4b. A color screen 7 for producing colored light is disposed on the rear face of the dimmer 6. The leads 5a, 5b, 5c ... connected to respective transparent electrodes are fixed on a printed substrate 8 by soldering. And, the lighting apparatus 13, a preferred embodiment of the present invention, is mounted on the printed substrate 8.

The surface lighting apparatus 13 comprises two miniature size incandescent lamps 9, 10 as light sources, and a transparent plate such as of acrylic resin is used as light guide 11. The light guide 11 has two top parts wherein the incandescent lamps 9, 10 are mounted. The top parts are defined by an upper surface having truncated corners and a V-shaped notch between lamps 9, 10. The resulting structure may be conceived of as two trapezoidal parts, each containing a respective one of lamps 9, 10, atop a substantially rectangular main body. For this reason, the top parts are referred to as being "trapezoidal". A reflecting frame 12 is disposed with its reflective inner walls closely around the light guide 11. A lead 10a of the incandescent lamp 10 is soldered to the printed substrate 8 as shown in FIG. 3, and the other incandescent lamp 9 is mounted on the substrate 8 similarly as the above-mentioned incandescent lamp 10. The incandescent lamps 9, 10 have respective filaments 9b, 10b arranged in a vertical direction as shown in FIG. 2 and FIG. 4. The light guide 11 has two holes 11a, 11g shaped almost substantially cylindrical holes with a heat discharging opening on the upper side of the incandescent lamps 9, 10 as shown in FIG. 4. The incandescent lamps 9, 10 are mounted in the holes 11a, 11g of cylinder shape in a manner that their filaments 9b, 10b extend vertical (i.e. in a direction perpendicular to the top edges of the light guide 11). And the incandescent lamps 9, 10 are mounted in the cylindrical holes 11a, 11g in coaxial manner with the axes of the latters, respectively, A white reflector, e.g. a light diffusive reflective layer 11b is painted or printed on the rear face of the light guide 11. The reflective layer 11b reflects and diffuses the light emitted from the incandescent lamps 9, 10, and radiates the light through the front face 11c of the light guide 11. The reflecting frame 12 made of a material of good light reflection, e.g. an alminium plate is fixed on the printed substrate 8 by soldering or bonding projections 12a, 12a thereto. The light reflective inner walls of the reflecting frame 12 is disposed to closely surround the light guide 11. Upside ends 12b, 12c of the reflecting frame 12 are formed in a shape like a roof to cover the trapezium shaped top parts of the light guide 11 for reflecting the lights emitted from the incandescent lamps 9, 10, respectively.

Figure 5:
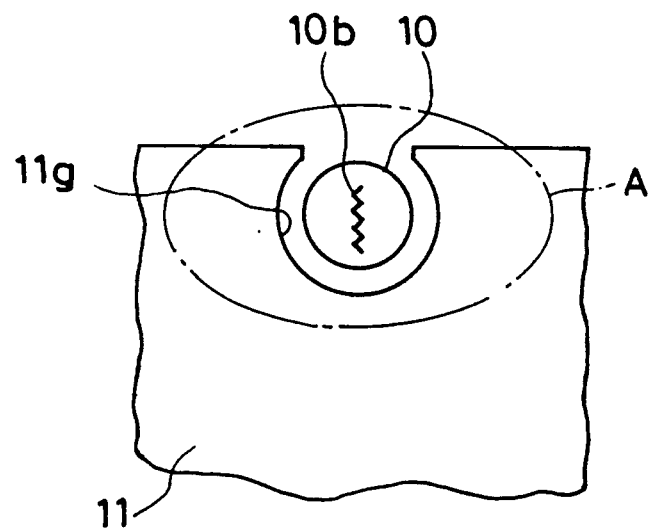
FIG. 5 is a illustration graph of luminance distribution of a light source in a light guide of the present invention.

The operation of the above-mentioned surface lighting apparatus of the present invention is elucidated hereafter:

Since the filaments 9b, 10b of the incandescent lamps 9, 10 are arranged in a vertical direction as shown in FIG. 2, a luminance distribution graph of the incandescent lamps 9, 10 becomes as shown in FIG. 5. FIG. 5 is a relative illustration graph of luminance distribution of the incandescent lamp 10 in the light guide 11. An oval line A in FIG. 5 shows an equi-potential curve of the luminance. Namely, luminance level of the filament 10b is the lowest in the directly lower part (i.e., in the direction of downward extension of the filament 10b), and the highest in the horizontal side (i.e., in the direction perpendicular to the direction of the extension of the filament). Since, the inner face of the cylindrical hole 11g is disposed coaxially with the incandescent lamp 10, the principal portion of the light emitted from the incandescent lamp 10 enters the light guide 11 in normal lines of the cylindrical hole 11g. Thus, an incident angle to the light guide 11 is smaller than the critical angle of acrylic resin, so that substantial all the light from the incandescent lamp 10 enters without substantial loss. As a result, the difference of the luminance between the part at the vicinity of the incandescent lamp 10 and the part distant therefrom becomes very little. Furthermore, remaining small difference of luminance can be adjusted by making the upper parts 12c of the frame 12 conform to the trapezoidal top parts of light guide 11, so as to properly transmit the light to achieve uniform luminance over all the face of the light guide 11. For example, in this embodiment, the both sides of the upper part 12c of the frames 12 are shaped like a roof, which has oblique edges having an angle of about 45° against vertical line as shown in FIG. 4. As a result, the light emitted horizontally from the incandescent lamp 10 is reflected vertically downward.

Thus, quantity of the incident light to be sent downward in the light guide 11 is almost uniform everywhere along width of the light guide 11. The light incident to the end face 11g is transmitted uniformly in the light guide 11, and the light is reflected diffusively by the diffusive reflective layer 11b, to emit light uniformly from the front face 11c of the light guide 11. Therefore, the luminance of the front face 11c on the light guide 11 is uniform. As a result, the color screen 7 is lit substantilly uniformly by the face 11c, and displays clearly. Further, the slightest unevenness of light is adjusted into very uniform luminance by the dimmer 6, and the LCD 4 is backlighted by the very uniform light. Accordingly, in the above-mentioned surface lighting apparatus of the present invention, the LCD 4 has uniform luminance everywhere.

Although the above-mentioned embodiment on assemblage has been described for backlighting the LCD 4, a surface lighting apparatus in accordance with the present invention can be applied as a backlighting for a transparent display board of other type, or as lighting apparatus per se.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Surface lighting apparatus comprising:
   at least one light source for emitting light;
   a light guide of light conductive material having at least one light receiving end face which is arranged to surround said light source, part of said light guide being trapezoidal in shape with sides arranged to have an angle of about 45° with the base of the trapezoid and said light receiving end face and said part of said light guide that is trapezoidal being formed along a longest dimension of said light guide;
   a light-diffusing reflective layer provided on a rear face of said light guide; and
   reflective frame having light reflective inside walls and a light output opening in a front face thereof, and surrounding said light guide closely, to reflect light uniformly in said light guide.

2. Surface lighting apparatus in accordance with claim 1 wherein
   said light receiving end face defines an aperture for containing said light source, said aperture having a cylindrical shape and having its axis perpendicular to said front face 3. Surface lighting apparatus in accordance with claim 2 wherein
   a filament of said light source is oriented substantially crosswise of said aperture, perpendicular to one of two parallel sides defining said part of said light guide that is trapezoidal.

* * * * *